United States Patent [19]

Parks et al.

[11] Patent Number: 5,005,888
[45] Date of Patent: Apr. 9, 1991

[54] GARDEN TOOL FOR REMOVING PLANTS HAVING ROOTS

[75] Inventors: David W. Parks, Dallas; Thomas A. Parks, Lindsay; Raymond Green, Richardson, all of Tex.

[73] Assignee: Speedy Weedy, Inc., Dallas, Tex.

[21] Appl. No.: 471,303

[22] Filed: Jan. 29, 1990

Related U.S. Application Data

[63] Continuation-in-part of Ser. No. 208,151, Jun. 17, 1988, abandoned.

[51] Int. Cl.$^5$ .............................................. A01B 1/16
[52] U.S. Cl. ...................................... 294/50; 294/61; 403/289; 403/329
[58] Field of Search ........................ 294/49–50.7, 294/51, 52, 55.5, 57, 59, 61, 120, 125, 126; 43/6; 56/400.08, 400.1; 111/92, 99; 172/21, 22, 25, 371, 378; 254/132; 403/289, 329, 330

[56] References Cited

U.S. PATENT DOCUMENTS

| | | | |
|---|---|---|---|
| 944,393 | 12/1909 | Whitney | 294/50.5 X |
| 1,092,818 | 4/1914 | Bittner | 294/50.5 |
| 1,134,618 | 4/1915 | Kaufman | 294/50.7 |
| 1,262,693 | 4/1918 | Page | 294/50.7 X |
| 1,466,168 | 8/1923 | Holton | 294/50.5 |
| 2,500,647 | 3/1950 | Schulthess | 294/50 X |
| 2,793,902 | 5/1957 | Govan | 294/57 |
| 2,804,336 | 8/1957 | Thompson | 294/61 |
| 3,169,403 | 2/1965 | McGinn | 403/329 X |
| 3,413,021 | 11/1968 | Potts | 403/289 X |
| 4,441,747 | 4/1984 | Bryington | 294/51 |

FOREIGN PATENT DOCUMENTS

| | | | |
|---|---|---|---|
| 225560 | 12/1947 | Finland | 294/126 |
| 354990 | 8/1931 | United Kingdom | 294/50.5 |

Primary Examiner—Johnny D. Cherry
Attorney, Agent, or Firm—Dunlap, Codding Peterson & Lee

[57] ABSTRACT

A garden tool for extracting a plant having roots in the earth. The garden tool basically comprises a housing and a prong assembly connected to the housing. The prong assembly includes a prong holder and at least three prongs with each prong being connected to the prong holder disposed generally near the outer peripheral surface of the prong holder. About one-fourth of a prong length of each of the prongs is disposed in the prong holder whereby the prong holder cooperates with the portions of the prongs disposed in the prong holder to provide sufficient strength for substantially reducing the tendency of the prongs to bend when disposed in the earth and rotated. The garden tool also includes a handle assembly which is connected to the upper end of the housing. The handle assembly and the prong assembly each are snappingly connectable to the housing and means are included for preventing the rotation of the prong assembly and the handle assembly relative to the housing in an assembled position of the prong assembly and the handle assembly connected to the housing. The present invention also contemplates a method of removing the plant using the garden tool wherein the earth surrounding the plant is moistened prior to the insertion of the prongs to facilitate the removal of substantially all of the root, and wherein the garden tool is rotated at least two full rotations to assure the formation of the plug.

19 Claims, 3 Drawing Sheets

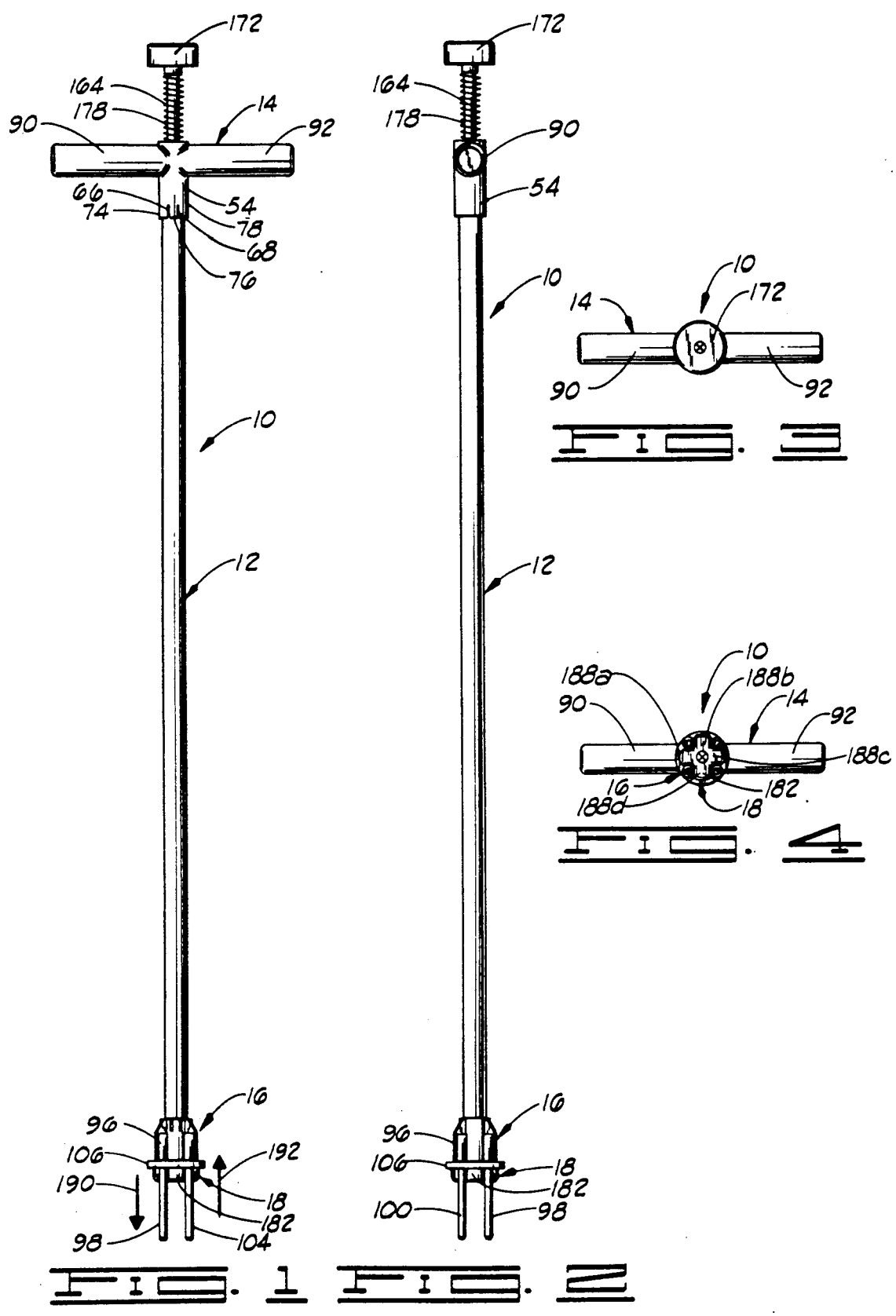

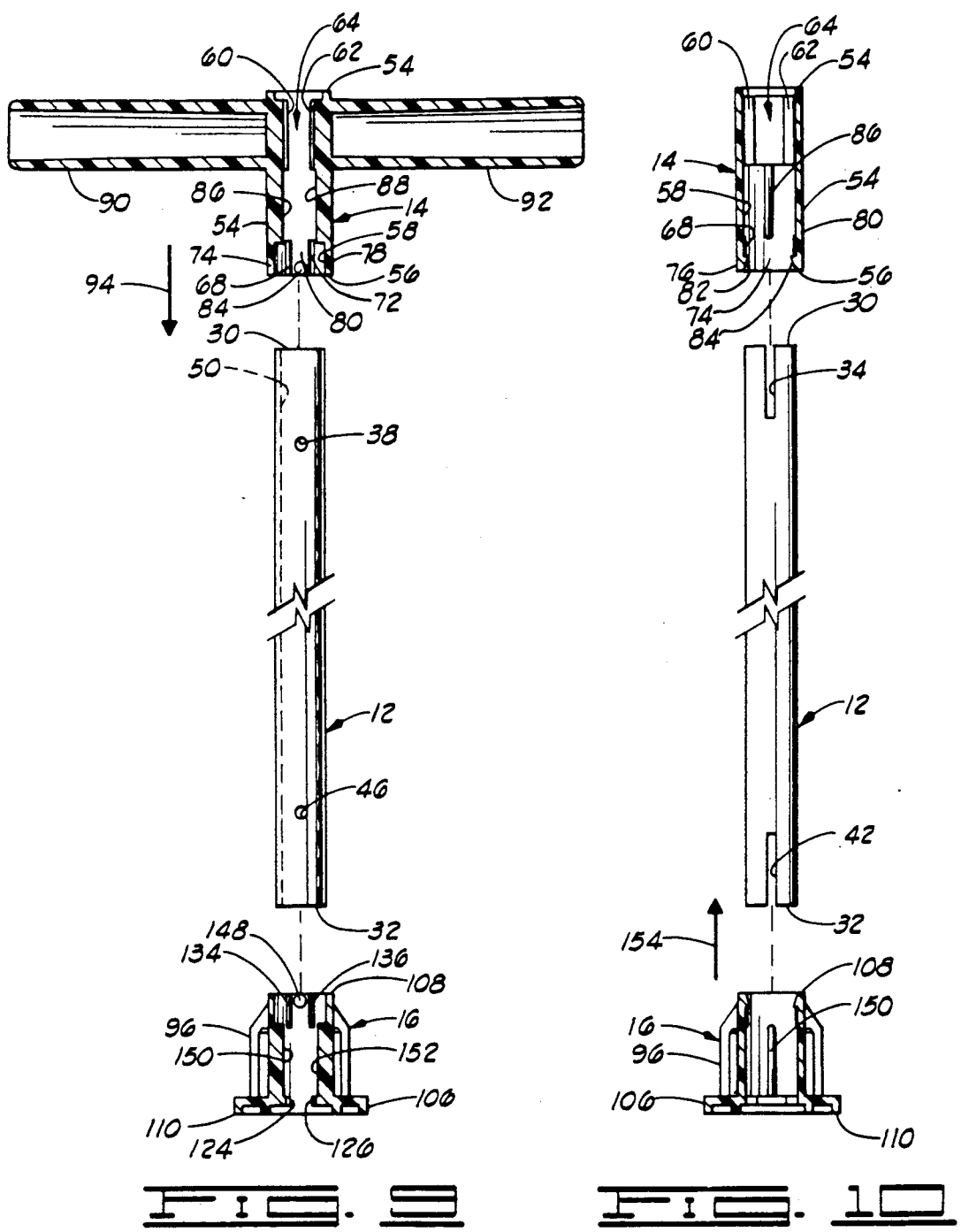

GARDEN TOOL FOR REMOVING PLANTS HAVING ROOTS

CROSS-RELATED APPLICATIONS

This is a continuation-in-part of U.S. Ser. No. 208,151, filed June 17, 1988 entitled "GARDEN TOOL FOR REMOVING WEEDS WITH FOUR PRONGS CAPABLE OF FORMING A CORE TO BE EXTRACTED ALONG WITH THE WEED", now abandoned.

FIELD OF THE INVENTION

The present invention contemplates a garden tool having a housing with a handle assembly snappingly connectable to the upper end of the housing and a prong assembly snappingly connectable to the lower end of the housing wherein the prong assembly is insertable in the earth and rotatable for compacting the earth about a plant to be extracted and forming a plug comprising the plant, a substantial portion of the plant roots and the earth disposed generally within the prong assembly, the plug being removable via a removal assembly.

BRIEF DESCRIPTION OF THE DRAWINGS

FIG. 1 is a typical front or back elevational view of a garden tool constructed in accordance with the present invention.

FIG. 2 is a typical side elevational view of the garden tool of FIG. 1, with the garden tool rotated 90° from the position shown in FIG. 1.

FIG. 3 is a top elevational view of the garden tool of FIGS. 1 and 2.

FIG. 4 is a bottom elevational view of the garden tool of FIGS. 1, 2 and 3.

FIG. 9 is an exploded view showing the housing with the handle assembly in a position about to be inserted on the housing and with the prong assembly (absent the prongs) in a position about to be inserted on the housing.

FIG. 10 is a view similar to FIG. 9, but showing the housing, the prong assembly and the handle assembly rotated at 90° as compared to the view shown in FIG. 9.

DESCRIPTION OF THE PREFERRED EMBODIMENTS

Figure 5:
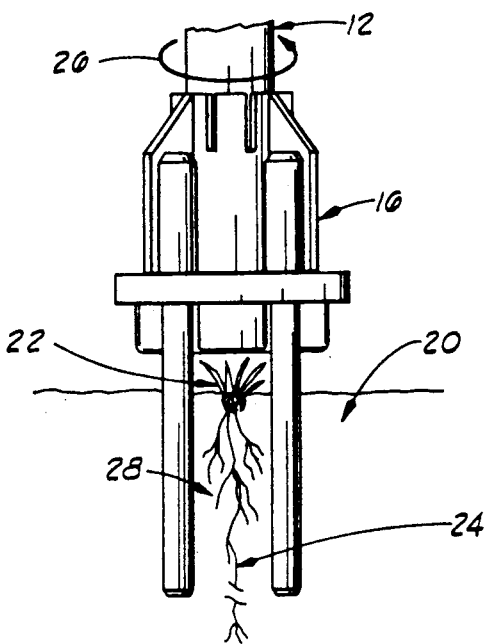
FIG. 5 is a diagrammatic view showing the prong assembly of the garden tool inserted in the earth about a plant having roots, the garden tool being shown not fully inserted in the earth.

Shown in FIGS. 1–4 is a garden tool constructed in accordance with the present invention and designated by the general reference numeral 10. The garden tool 10 basically comprises housing 12 (FIGS. 1 and 2), a handle assembly 14 connected generally to an upper end of the housing 12, a prong assembly 16 (FIGS. 1, 2 and 4) generally connected to a lower end of the housing 12 and a removal assembly 18 (FIGS. 1, 2 and 4) movably connected to the housing 12.

The garden tool 10 particularly is adapted to remove plants such as weeds having roots from the earth. As diagrammatically illustrated in FIG. 5, the prong assembly 16 generally is inserted into the earth (designated by the general reference numeral 20 in FIG. 5) in a position wherein the prong assembly 16 is disposed generally about the plant to be extracted (a plant being diagrammatically shown in FIG. 5 and designated therein by the general reference numeral 22). Plants have roots or a root system (a root 24 being diagrammatically shown in FIG. 5). The root or at least some of the roots 24 typically extend a distance downwardly into the earth. When the prong assembly 16 is inserted into the earth, the root 24 of the plant 22 typically extends a distance into the earth beyond the prong assembly 16, as diagrammatically shown in FIG. 5.

After the prong assembly 16 is inserted into the earth generally about the plant 22, the operator gripping the handle assembly 14 rotates the garden tool 10 in a direction 26 (FIG. 5) thereby rotating the prong assembly 16 generally about the plant 22 to be extracted. The operator will rotate the prong assembly 16 at least two full rotations and preferably more, typically in a range from about 2 to about 4 rotations, thereby compacting a portion of the earth 28 disposed generally within the prong assembly 16 and about the plant 22 to be extracted causing a plug to be formed generally within the prong assembly 16, the plug comprising the plant 22, a substantial portion of the plant root 24 and the portion of the earth 28 disposed generally within the prong assembly 16 and surrounding the plant 22 to be extracted. The prong assembly 16 then is removed from the earth 20 thereby removing the plug. The operator then actuates the removal assembly 16 to remove the plug from the prong assembly 16.

If the earth 20 generally about the plant 22 is relatively dry, it has been found that the rotation of the prong assembly 16 and the forming of the plug will cause the root 24 to be severed at some point generally between the end of the prong assembly 16 and the end of the root 24, thereby causing a portion of the root 24 to be left in the earth 20 when the plug is removed by the garden tool 10. This is not desirable since the portion of the root 24 left in the earth merely will result in the plant or weed being grown at the point of removal. It has been found desirable to apply water to the earth 20 generally about the plant 22 and the root 24 prior to effecting the removal of the plant 22. After the earth 20 has been moistened by the application of water, the prong assembly 16 then is inserted into the earth and rotated to form the plug. Since the earth 20 now is moistened, the root 24 is substantially free to rotate along with the rotation of the prong assembly 16 and the plug being formed thereby causing the portion of the root 24 extending downwardly from the end of the prong assembly 16 to be loosened from the surrounding earth. In this manner, substantially the entire root 24 is removed when the plug is removed along with the prong assembly 16.

The housing 12 preferably is cylindrically shaped and has an upper end 30 and a lower end 32 (shown in FIGS. 9 and 10). A pair of slits 34 (FIG. 10) are formed in the housing 12 with each slit 34 extending through the upper end 30 of the housing 12 and extending a distance generally toward the lower end 32 of the housing 12 (only one of the slits 34 being shown in FIG. 10). Each slit 34 forms a pair of oppositely opposed walls in the housing 12 for reasons to be made more apparent below.

The slits 34 are diametrically opposed or, in other words, one of the slits 34 is disposed about 180° from the other slit 34.

A pair of snap holes 38 are formed in the housing 12 (only one of the snap holes being shown in FIG. 9). Each snap hole 38 is spaced a distance generally from the upper end 30 of the housing 12. The snap holes 38 are diametrically opposed or, in other words, one of the snap holes 38 is disposed about 180° from the other snap hole 38. The snap holes 38 are positioned generally between the slits 34 with each of the snap holes 38 being spaced about 90° from the slits 34, for reasons which will be made more apparent below.

A pair of slits 42 (FIG. 10) are formed in the housing 12 with each slit 42 extending through the lower end 32 of the housing 12 and extending a distance generally toward the upper end 30 of the housing 12. Each slit 42 forms a pair of oppositely opposed walls in the housing 12 for reasons to be made more apparent below. The slits 42 are positioned on the housing 12 in diametrically opposed positions or, in other words, one of the slits 42 is disposed about 180° from the other slit 42.

A pair of snap holes 46 (FIG. 9) are formed in the housing 12 (only one of the snap holes 46 being shown in FIG. 9). Each snap hole 46 is spaced a distance generally from the upper end 30 of the housing 12. The snap holes 38 are diametrically opposed or, in other words, one of the snap holes 46 is disposed about 180° from the other snap hole 46. The snap holes 46 are positioned generally between the slits 42 with each snap hole 46 being spaced about 90° from the slits 42, for reasons which will be made more apparent below.

A housing opening 50 (FIG. 9) is formed through the housing 12 intersecting the upper and the lower ends 30 and 32 of the housing 12. The housing opening 50 generally is circularly shaped and cross-sectioned. The slits 34 and 42 and the snap holes 38 and 46 each intersect the housing opening 50.

As shown more clearly in FIGS. 9 and 10, the handle assembly 14 comprises a tubular or circular shaped handle base 52. The handle base 52 has an upper end 54 and a lower end 56. A cylindrically shaped base opening 58 is formed through the lower end 56 of the handle base 52 and the base opening 58 extends a distance through the handle base 52 generally toward the upper end 54.

Walls 60 and 62 (FIG. 9 and 10) are formed in the base opening 58 generally near the upper end 54 of the handle base 52. The walls 60 and 62 are diametrically opposed and form a generally square or rectangular removal shaft slot 64 in the base opening 58, for reasons to be made more apparent below.

A pair of slits 66 and 68 (FIGS. 1 and 10) are formed in the handle base 52 with each of the slits 66 and 68 intersecting the lower end 56 and extending a distance generally toward the upper end 54. A second pair of slits 70 and 72 (FIG. 9) are formed in the handle base 52 with each of the slits 70 and 72 intersecting the lower end 56 and extending a distance generally toward the upper end 54 of the handle base 52. The slits 66, 68, 70 and 72 form four tabs 74, 76, 78 and 80 (FIGS. 1, 9 and 10) on the handle base 52.

A snap knob 82 (FIG. 10) is formed on the handle base 52 generally near the lower end 56. The snap knob 82 is disposed on the tab 76 and disposed generally within the base opening 58. The snap knob 82 extends a distance generally into the base opening 58.

A snap knob 84 (FIGS. 9 and 10) is formed on the handle base 52 generally near the lower end 56. The snap knob 84 is disposed on the tab 80 and disposed generally within the base opening 58. The snap knob 84 extends a distance generally into the base opening 58.

A retaining ridge 86 (FIGS. 9 and 10) is formed on the handle base 52. The retaining ridge 86 is disposed generally within the base opening 58 and the retaining ridge 86 disposed generally on the tab 74. The retaining ridge 86 extends a distance into the base opening 58 and extends a distance generally between the upper and the lower ends 54 and 56 of the handle base 52, for reasons to be made more apparent below.

A retaining ridge 88 (FIG. 9) is formed on the handle base 52. The retaining ridge 88 is disposed generally within the base opening 58 and the retaining ridge 88 disposed generally on the tab 78. The retaining ridge 88 extends a distance into the base opening 58 and extends a distance generally between the upper and the lower ends 54 and 56 of the handle base 52, for reasons to be made more apparent below.

The handle assembly 14 also includes a pair of handle bars 90 and 92, as shown in FIGS. 1, 2, 3, 4 and 9. One end of each handle bar 90 and 92 is connected to the handle base 52 and each handle bar 90 and 92 extends a distance generally outwardly from the handle base 52. The handle bars 90 and 92 are disposed on opposite sides of the handle base 52 and the handle bars 90 and 92 each extend in opposite directions from the handle base 52.

In a preferred form, the handle base 52 and the handle bars 90 and 92 are constructed of a plastic material and are integrally constructed to form a single unitary piece.

To assemble the handle assembly 14 to the housing 12, the lower end 56 of the handle base 52 is disposed generally above the upper end 30 of the housing 12 and positioned so that the retaining ridges 86 and 88 each are aligned with one of the slits 34 in the housing 12. In this position, the snap knobs 82 and 84 also are aligned with the snap holes 38 in one direction. In this position, the handle assembly 14 is lowered in a direction 94 (FIG. 9) causing the upper end 30 of the housing 12 to be inserted into the base opening 58 generally at the lower end 56 of the handle base 52. The handle base 52 further is lowered in the direction 94 to insert the upper end 30 of the housing 12 into the base opening 58. As the housing 12 is inserted into the base opening 58, the tabs 74, 76, 78 and 80 are spread slightly apart to permit the housing 12 to be inserted through the base opening 58 and accommodate the snap knobs 82 and 84. As the handle base 52 is lowered onto the housing 12, the retaining ridges 86 and 88 each are disposed in one of the slits 34. The handle base 52 is lowered onto the upper end 30 of the housing 12 to a position wherein the snap knobs 82 and 84 each are snappingly disposed in one of the snap holes 38 to lock the handle assembly 14 to the housing 12. In this position, the handle assembly 14 is prevented from being rotated on the housing 12 via the engagement between the retaining ridges 86 and 88 and the walls formed in the housing 12 via the slits 34.

The prong assembly 16 comprises a prong holder 96 and at least two prongs and preferably four prongs, four prongs being shown in FIGS. 1, 2, 4, 7 and 8 and designated therein via the respective reference numerals 98, 100, 102 and 104.

The prong holder has an outer peripheral surface 106 (FIGS. 1 and 2), an upper end 108 (FIGS. 7, 8, 9 and 10) and a lower end 110 (FIGS. 7, 8, 9 and 10). The prong holder 96 is connectable to the lower end 32 of the housing 12.

Figure 7:
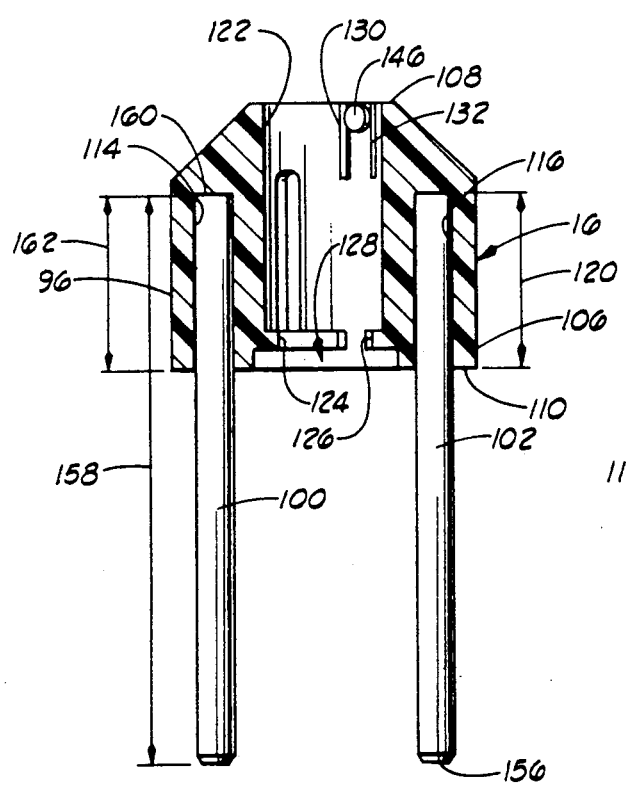
FIG. 7 is a sectional view of the prong assembly of the garden tool of the present invention.
Figure 8:
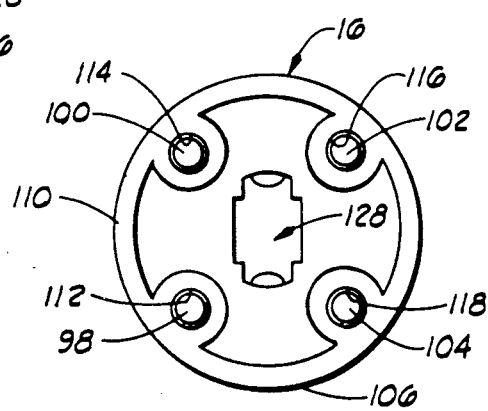
FIG. 8 is a bottom elevational view of the prong assembly of FIG. 7.

At least two and preferably four prong openings are formed in the prong holder 12, four prong openings being shown in FIGS. 7 and 8 and designated therein via the respective reference numerals 112, 114, 116 and 118. Each of the prong openings 112, 114, 116 and 118 extends through the lower end 110 of the prong holder 12 and extends a distance generally toward the upper end 108 of the prong holder 96. Each prong opening 112, 114, 116 and 118 extends a length 120 (shown in FIG. 7 with respect to the one prong opening 116) into the prong holder 96 generally from the lower end 110 toward the upper end 108.

A generally circularly shaped holder opening 122 (FIG. 7) is formed through the upper end 108 of the prong holder 96 and the holder opening 122 extends a distance through the prong holder 96 intersecting the upper and the lower ends 108 and 110. A pair of walls 124 and 126 (FIGS. 7 and 9) are connected to the prong holder 96 and each of the walls 124 and 126 is disposed generally within the holder opening 122. Each of the walls 124 and 126 extends a distance into the holder opening 122. The walls 124 and 126 cooperate to form a generally square or rectangularly shaped removal shaft slot 128 (FIG. 7) in the prong holder 96.

A pair of slits 130 and 132 (FIG. 7) are formed in the prong holder 96, the slits 130 and 132 being spaced a distance apart and each of the slits 130 and 132 extending a distance from the upper end 108 to the lower end 110 of the prong holder 96. A second pair of slits 134 and 136 (FIG. 9) are formed through the upper end 108 of the prong holder 96 and each of the slits 134 and 136 extends a distance generally from the upper end 108 toward the lower end 110 of the prong holder 96. The slits 130, 132, 134 and 136 cooperate to form four tabs generally on the upper end 108 of the prong holder 96.

A snap knob 146 (FIG. 7) is formed on the prong holder 96. The snap knob 146 is disposed generally within the holder opening 122 and the snap knob 146 extends a distance generally into the holder opening 122, the snap knob 146 being spaced a distance from the upper end 108 of the prong holder 96.

A snap knob 148 (FIG. 9) is formed on the prong holder 96. The snap knob 148 is disposed generally within the holder opening 122 and the snap knob 148 extends a distance generally into the holder opening 122, the snap knob 148 being spaced a distance from the upper end 108 of the prong holder 96.

A retaining ridge 150 (FIGS. 9 and 10) is formed on the prong holder 96. The retaining ridge 150 is disposed generally within the holder opening 122 and the retaining ridge 150 extends a distance generally between the upper and the lower ends 108 and 110 of the prong holder 96.

A retaining ridge 152 (FIG. 9) is formed on the prong holder 96. The retaining ridge 152 is disposed generally within the holder opening 122 and the retaining ridge 152 extends a distance generally between the upper and the lower ends 108 and 110 of the prong holder 96.

To assemble the prong holder 96 to the lower end 32 of the housing 12, the upper end 108 of the prong holder 96 is disposed generally below the lower end 32 of the housing 12 with the retaining ridges 150 and 152 each being generally aligned with one of the slits 42 in the housing 12. In this position, the snap knobs 146 and 148 also each are aligned in one direction with the snap holes 46 in the housing 12.

The prong holder 96 then is moved in an upwardly direction 154 (FIG. 10) thereby causing the lower end 32 of the housing 12 to be inserted generally within the holder opening 122 generally at the upper end 108 of the prong holder 96. The prong holder 96 is continued to be moved in a direction 154 further inserting the lower end 32 of the housing 12 into the holder opening 122 to a position wherein the snap knobs 146 and 148 snappingly are disposed into the snap holes 46 in the housing 12 thereby locking the prong holder 96 to the housing 12. In this position, the retaining ridges 150 and 152 each are disposed in one of the slits 42 in the housing 12. The retaining ridges 150 and 152 engage the walls formed in the housing 12 by the slits 42 to prevent rotation of the prong holder 96 about the housing 12 in an assembled position with the prong assembly 16 connected to the housing 12. As the prong holder 96 is disposed or inserted onto the housing 12, the tabs formed by the slits 130, 132, 134 and 136 slightly are spread apart to accommodate the housing 12 being inserted into the holder opening 122 until the snap knobs 146 and 148 are snappingly disposed into the respective snap holes 46.

The prongs 98, 100, 102 and 104 each are identical in construction. Each prong 98, 100, 102 and 104 is generally cylindrically shaped in cross section and a lower end 156 (FIG. 7) of each of the prongs 98, 100, 102 and 104 is slightly rounded. Each prong has an overall prong length 158 (FIG. 7) extending generally between the lower end 156 and an upper end 160 (FIG. 7) of each prong 98, 100, 102 and 104. A portion of each prong 98, 100, 102 and 104 generally near the upper end 160 thereof is inserted into one of the prong openings 112, 114, 116 and 118. In an assembled position of the prongs 98, 100, 102 and 104 in the prong openings 112, 114, 116 and 118, a length 162 (FIG. 7) of each prong 98, 100, 102 and 104 is disposed in one of the prong openings 98, 100, 102 and 104. The length 162 is about equal to the length 120. Preferably, at least about one-fourth of the prong length 158 of each of the prongs 98, 100, 102 and 104 is disposed in one of the prong openings 112, 114, 116 and 118. In this manner, the prong holder 96 cooperates with the portions of the prongs 98, 100, 102 and 104 to provide sufficient strength to substantially reduce the tendency of the prongs 98, 100, 102 and 104 to bend when the prong assembly 16 is disposed in the earth and rotated to remove the plant 22.

Figure 6:
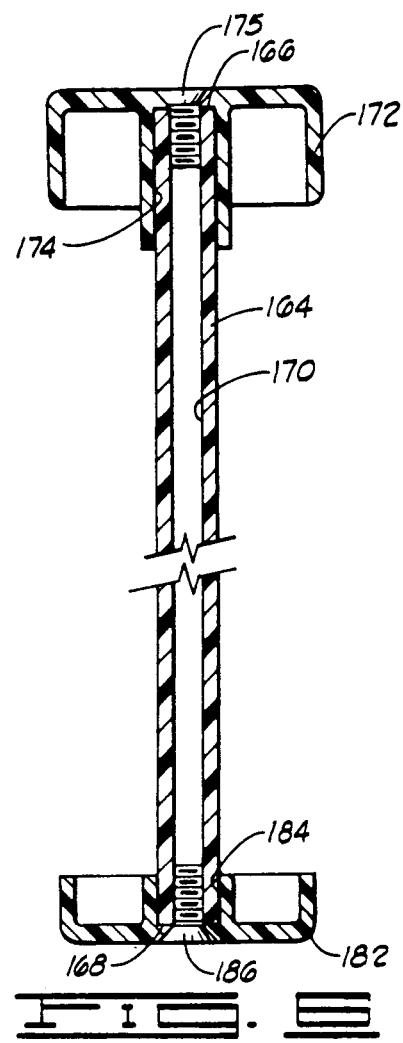
FIG. 6 is a sectional view of the removal shaft with the cap and removal plastic connected thereto and removed from the housing.

The removal assembly 18 comprises a removal shaft 164 (FIG. 1, 2 and 6) having an upper end 166 (FIG. 6) and a lower end 168 (FIG. 6). The removal shaft 164 has a square or rectangularly shaped (sided) shape in one cross section. A removal shaft opening 170 (FIG. 6) extends through the removal shaft 164 intersecting the upper and the lower ends 166 and 168 thereof. The removal shaft opening 170 also has a rectangular or square (sided) shape in one cross section.

The removal shaft 164 is disposed through the housing opening 50 to a position wherein a portion of the removal shaft 164 generally near the upper end 166 thereof extends a distance beyond the upper end 30 of the housing 12 and a portion of the removal shaft 164 generally near the lower end 168 thereof extends a distance beyond the lower end 32 of the housing 12.

A cap 172 (FIGS. 1, 2, 3 and 6) is secured to the upper end 166 of the removal shaft 164. The cap 172 (FIG. 6) has a sided or square cap opening 174 (FIG. 6) formed through a portion thereof. The cap opening, 174 is sized to receive a portion of the removal shaft 164 generally near the upper end 166 thereof. A recess is formed in the upper end of the cap 172.

To assemble the cap 172 to the removal shaft 164, the upper end 166 of the removal shaft 164 is disposed in the cap opening 174 and a screw 175 (FIG. 6) is inserted through an opening in the cap 172 and the screw 175 is threadedly engaged and disposed through a portion of the removal shaft opening 170 generally near the upper end 166 thereof. The removal shaft opening 170 provides a means for starting the screw into the removal shaft 164 for connecting the cap 172 to the removal shaft 164, thereby eliminating the need to tap the upper end 166 of the removal shaft 164.

A spring 178 (FIGS. 1 and 2) is disposed generally over the removal shaft 164 generally near the upper end 166 thereof. One end of the spring 178 engages the lower end of the cap 172 and the opposite end of the spring 178 is disposed in a recess in the upper end 54 of the handle base 52, one end of the spring 178 engaging the handle base 52.

The removal assembly 18 also includes a removal plate 182 (FIGS. 2, 4 and 6). The removal plate 182 is connected to the lower end 168 of the removal shaft 164. More particularly, the removal plate 182 includes a square or sided plate opening 184 (FIG. 6) which is sized to slidingly receive the lower end 168 of the removal shaft 164. The removal shaft 164 is disposed in the plate opening 184 and the removal plate 182 is connected to the removal shaft 164 via a screw 186. The screw 186 extends through the removal plate 182 and is threadingly disposed in the removal shaft opening 170. For reasons mentioned before with respect to the cap 172, the removal shaft opening 170 eliminates the need for tapping the lower end 168 of the removal shaft 164 and facilitates the connecting of the removal plate 182 to the removal shaft 164.

The removal plate 182 is disposed generally between the prongs 98, 100, 102 and 104. The prongs 98, 100, 102 and 104 are disposed near the outer peripheral surface 106 of the prong holder 96 and the prongs 98, 100, 102 and 104 are spaced at about 90° intervals about the outer peripheral surface 106 of the prong holder 96. The removal plate 182 includes four removal flanges 188, individually designated in FIG. 4 by the reference numerals 188a, 188b, 188c and 188d. Each of the removal flanges 188 is disposed generally between two of the prongs 98, 100, 102 and 104.

To assemble the garden tool 10, the prong assembly 16 initially is snappingly connected to the lower end 32 of the housing 12 in the manner described before. The removal shaft 164 then is inserted through the housing opening 50 and through the removal shaft slot 128 in the prong assembly 16 (the removal shaft slot 128 cooperating to prevent the removal shaft 164 from rotating in the prong assembly 16). The lower end 168 of the removal shaft 164 then is extended beyond the lower ends 156 of the prongs 98, 100, 102 and 104 and the removal plate 182 is secured to the lower end 168 of the removal shaft 164. In this condition of the garden tool 10, the garden tool 10 may be shipped and the handle assembly 14 along with the spring 178, and the cap 172 may be shipped as separate components for assembly by the user. In this manner, the shipping carton size may be reduced since the handle assembly 14 is not assembled to the housing 12.

In any event, ultimately the handle base 52 is inserted over the upper end 166 of the removal shaft 164 disposing the removal shaft 164 through the base opening 58 and through the removal shaft slot 64 in the handle assembly 14. The handle base 52 then is further moved in the direction 94 and snappingly connected to the upper end 30 of the housing 12 in the manner described before. The spring 178 then is inserted over the upper end 166 portion of the removal shaft 164 to a position wherein one end of the spring 178 is disposed in the recess in the upper end 54 of the handle base 52. The cap 172 then is secured to the upper end 166 of the removal shaft 164.

The garden tool 10 is operated in the manner described before to remove the plug from the earth. After the plug has been removed from the earth, the individual depresses the cap 172 thereby compressing the spring 178 and moving the removal shaft and the removal plate 182 connected thereto in a downward direction 190 (FIG. 1). As the removal plate 182 is moved in the downward direction 190 through the prongs 98, 100, 102 and 104, the removal plate 182 engages the plug which is disposed between the prongs 98, 100, 102 and 104 and ejects the plug from the prong assembly 16. After the plug has been ejected from the prong assembly 16, the operator releases the cap 172 and the spring 178 biases the cap 172 and the removal shaft 164 connected thereto in an upwardly direction 192 (FIG. 1) thereby causing the removal plate 182 to be moved back to a storage position disposed generally adjacent the lower end 110 of the prong holder 96.

The prong holder 96 preferably is a molded plastic part. It has been found desirable to insert the prongs 98, 100, 102 and 104 into the respective prong openings 112, 114, 116 and 118 while the prong holder 96 still is warm from the molding process. In this manner, the prong holder 96 shrinks about each of the prongs 98, 100, 102 and 104 for securing the prongs 98, 100, 102 and 104 connected to the prong holder 96.

Changes may be made in the construction and the operation of the various components, elements and assemblies described herein and changes may be made in the steps or sequence of steps of the methods described herein without departing from the spirit and scope of the invention as defined in the following claims.

What is claimed is:

1. A garden tool for extracting a plant having roots in the earth comprising:

a housing having an upper end and a lower end;

a prong assembly connected to the lower end of the housing and being adapted for insertion in the earth generally about the plant to be extracted, the housing and the prong assembly being rotatable after insertion in the earth for compacting the earth about the plant to be extracted and forming a plug comprising the plant, a substantial portion of the plant root and a portion of the earth disposed generally within the prong assembly and surrounding the plant to be extracted, the housing and the prong assembly being removed from the earth along with the plug, comprising:

a prong holder having an outer peripheral surface, an upper end and a lower end, the upper end of the prong holder being connectable to the lower end of the housing and at least three prong openings being formed in the lower end of the prong holder generally near the outer peripheral surface of the prong holder with each prong opening extending a length into the prong holder generally from the lower end toward the upper end of the prong holder; and at least three prongs, each prong having an upper end, a lower end and a prong length, the upper end of each prong being disposed in one of the prong openings and each prong being inserted in one of the prong openings with at least about one-fourth of the prong length of each prong being disposed in one of the prong openings whereby the prong holder cooperates with the portions of the prongs disposed in the prong holder to provide sufficient strength for substantially reducing the tendency of the prongs to bend when disposed in the earth and rotated during the operation of the garden tool; and wherein the housing includes a slit formed through the lower end thereof and extending a distance generally toward the upper end thereof and a snap hole formed through a portion thereof and spaced a distance generally above the lower end thereof, and wherein the prong holder further comprises a holder opening extending through a portion thereof intersecting the upper and the lower ends of the prong holder, and a retaining ridge connected to the prong holder and disposed generally within the holder opening and extending a distance into the holder opening, the retaining ridge being disposable in the slit formed in the housing generally near the lower end thereof in the assembled position of the prong holder connected to the lower end of the housing for cooperating to substantially prevent rotation of the prong holder relative to the housing, and wherein the prong holder further comprises a snap knob connected to the prong holder and disposed generally within the holder opening, the snap knob being snappingly disposable in the snap hole formed in the housing generally near the lower end thereof for snappingly connecting the prong assembly to the housing in an assembled position.

2. The garden tool of claim 1 wherein the prong assembly is defined further to comprise four prongs and four prong openings in the prong holder with each prong disposed generally near the outer peripheral surface of the prong holder and the prongs being spaced at about 90° intervals generally about the outer peripheral surface of the prong holder.

3. The garden tool of claim 1 wherein each prong is defined further as being generally cylindrically shaped and the lower end of each prong being rounded.

4. The garden tool of claim 1 wherein the prong holder further comprises at least two slits formed through the upper end thereof with each slit intersecting the upper end and intersecting the holder opening and extending a distance generally toward the lower end of the prong holder, the slits forming tabs on the prong holder which are expandable to facilitate the insertion of the lower end of the housing into the holder opening.

5. A garden tool for extracting a plant having roots in the earth comprising:

a housing having an upper end and a lower end, the housing having a housing opening extending therethrough intersecting the upper and the lower ends thereof;

a prong assembly connected to the lower end of the housing and being adapted for insertion in the earth generally about the plant to be extracted, the housing and the prong assembly being rotatable after insertion in the earth for compacting the earth about the plant to be extracted and forming a plug comprising the plant, a substantial portion of the plant root and a portion of the earth disposed generally within the prong assembly and surrounding the plant to be extracted, the housing and the prong assembly being removed from the earth along with the plug, comprising:

a prong assembly holder having an outer peripheral surface, an upper end and a lower end, the upper end of the prong holder being connectable to the lower end of the housing and at least three prong openings being formed in the lower end of the prong holder generally near the outer peripheral surface of the prong holder with each prong opening extending a length into the prong holder generally from the lower end toward the upper end of the prong holder; and at last three prongs, each prong having an upper and a lower end and a prong length, the upper end of each prong being inserted in one of the prong openings with at least about one-fourth of the prong length of each prong being disposed in one of the prong openings whereby the prong holder cooperates with the portions of the prongs disposed in the prong holder to provide sufficient strength for substantially reducing the tendency of the prongs to bend when disposed in the earth and rotated during the operation of the garden tool; and means for removing the plug from the prong assembly, comprising:

a cap connected to a first end of a removal shaft; and a spring disposed generally between the upper end of the housing and the cap, the spring being adapted to springingly move the removal shaft and a removal plate connected thereto from an eject position to a storage position, the cap being movable in one direction against the spring for moving the removal shaft and the removal plate connected thereto from the storage position to the eject position; and a removal shaft slidingly disposed in the housing opening having a first end and a second end, the first end extending a distance generally above the upper end of the housing and the second end extending a distance generally below the lower end of the housing;

a removal plate connected to the second end of the removal shaft and being disposed generally within the prongs of the prong assembly; and means for removing the removal shaft from the storage position to the eject position whereby the removal plate is movable from the storage position disposed generally adjacent the prong assembly to the eject position for ejectingly removing the plug from the prong assembly, the removal shaft having a removal shaft opening extending therethrough and intersecting the upper and the lower ends thereof, the cap being connected to the first end of the removal shaft via a screw extending through the cap and being threadedly extended through a portion of the removal shaft opening generally near the first end of the removal shaft whereby the removal shaft opening provides means for initiating the threaded connection of the screw to the removal shaft.

6. The garden tool of claim 5 wherein the removal plate is further defined as being connected to the second end of the housing via a screw extending through the removal plate and being threadedly extended through a portion of the removal plate opening generally near the second end of the removal shaft whereby the removal shaft opening provides means for initiating the threaded connection of the screw to the removal shaft.

7. A garden tool for extracting a plant having roots in the earth comprising:
a housing having an upper end and a lower end;
a prong assembly connected to the lower end of the housing and being adapted for insertion in the earth generally about the plant to be extracted, the housing and the prong assembly being rotatable after insertion in the earth for compacting the earth about the plant to be extracted and forming a plug comprising the plant, a substantial portion of the plant root and a portion of the earth disposed generally within the prong assembly and surrounding the plant to be extracted, the housing the prong assembly being removed from the earth along with the plug, comprising:
a prong holder having an outer peripheral surface, an upper end and a lower end, the upper end of the prong holder being connectable to the lower end of the housing and at least three prong openings being formed in the lower end of the prong holder generally near the outer peripheral surface of the prong holder with each prong opening extending a length into the prong holder generally from the lower end toward the upper end of the prong holder; and
at least three prongs, each prong having an upper end, a lower end and a prong length, the upper end of each prong being disposed in one of the prong openings and each prong being inserted in one of the prong openings with at least about one-fourth of the prong length of each prong being disposed in one of the prong openings whereby the prong holder cooperates with the portions of the prongs disposed in the prong holder to provide sufficient strength for substantially reducing the tendency of the prongs to bend when disposed in the earth and rotated during the operation of the garden tool; and
a handle assembly connected to the upper end of the housing, the handle assembly comprising:
a handle base having an upper end and a lower end and a base opening extending therethrough intersecting the upper and the lower ends thereof, a retaining ridge being connected to the handle base and disposed generally within the base opening and extending a distance generally into the base opening, and a snap knob connected to the handle base and disposed in the base opening and extending a distance generally into the base opening; and
wherein the housing further comprises a slit formed through the upper end thereof and extending a distance generally toward the lower end thereof, the slit being sized to slidingly receive the retaining ridge on the handle base when the upper end of the housing is inserted into the base opening, the retaining ridge cooperating to substantially prevent rotational movement of the handle base relative to the housing, and wherein the housing further comprises a snap hole extending a distance through the housing and being disposed generally near the upper end of the housing, the snap hole being sized to snappingly receive the snap knob formed on the handle base when the handle base is disposed on the upper end of the housing for snappingly connecting the handle base to the housing.

8. The garden tool of claim 7 further comprising:
means for snappingly connecting the handle assembly to the upper end of the housing.

9. The garden tool of claim 8 further comprising:
means for preventing the rotation of the handle base relative to the housing.

10. The garden tool of claim 7 wherein the handle assembly further comprises:
a pair of handle rods, one end of each handle rod being connected to the handle base and each handle rod extending a distance from the handle base in opposite directions.

11. A garden tool for extracting a plant having roots in the earth comprising:
a housing having an upper end and a lower end;
a prong assembly connected to the lower end of the housing and being adapted for insertion in the earth generally about the plant to be extracted, the housing and the prong assembly being rotatable after insertion in the earth for compacting the earth about the plant to be extracted and forming a plug comprising the plant, a substantial portion of the plant root and a portion of the earth disposed generally within the prong assembly and surrounding the plant to be extracted, the housing and the prong assembly being removed from the earth along with the plug, comprising:
means for snappingly connecting the prong assembly to the lower end of the housing;
a handle assembly;
means for snappingly connecting the handle assembly to the upper end of the housing; and
a prong holder having an outer peripheral surface, an upper end and a lower end, the upper end of the prong holder being connectable to the lower end of the housing and at least three prong openings being formed in the lower end of the prong holder generally near the outer peripheral surface of the prong holder with each prong opening extending a length into the prong holder generally from the lower end toward the upper end of the prong holder; and
at least three prongs, each prong having an upper end, a lower end and a prong length, the upper end of each prong being disposed in one of the prong openings and each prong being inserted in one of the prong openings with at least about one-fourth of the prong length of each prong being disposed in one of the prong openings whereby the prong holder cooperates with the portions of the prongs disposed in the prong holder to provide sufficient strength for substantially reducing the tendency of the prongs to bend when disposed in the earth and rotated during the operation of the garden tool; and wherein the housing includes a slit formed through the lower end thereof and extending a distance generally toward the upper end thereof and a snap hole formed through a portion thereof and spaced a distance generally above the lower end thereof, and wherein the prong holder further comprises a holder opening extending through a portion thereof intersecting the upper end and the lower end of the prong holder, and a retaining ridge connected to the prong holder and disposed generally within the holder opening and extending a distance into the holder opening, the retaining ridge being disposable in the slit formed in the housing generally near the lower end thereof in the assembled position of the prong holder connected to the lower end of the housing for cooperating to substantially prevent rotation of the prong holder relative to the housing, and wherein the prong holder further comprises a snap knob connected to the prong holder and disposed generally within the holder opening, the snap knob being snappingly disposable in the snap hole formed in the housing generally near the lower end thereof for snappingly connecting the prong assembly to the housing in an assembled position.

12. The garden tool of claim 11 wherein the prong holder further comprises at least two slits formed through the upper end thereof with each slit intersecting the upper end and intersecting the holder opening and extending a distance generally toward the lower end of the prong holder, the slits forming tabs on the prong holder which are expandable to facilitate the insertion of the lower end of the housing into the holder opening.

13. A garden tool for extracting a plant having roots in the earth comprising:
   a housing having an upper end and a lower end;
   a prong assembly connected to the lower end of the housing and being adapted for insertion in the earth generally about the plant to be extracted, the housing and the prong assembly being rotatable after insertion in the earth for compacting the earth about the plant to be extracted and forming a plug comprising the plant, a substantial portion of the plant root and a portion of the earth disposed generally within the prong assembly and surrounding the plant to be extracted, the housing and the prong assembly being removed from the earth along with the plug, comprising:
   means for snappingly connecting the prong assembly to the lower end of the housing;
   a handle assembly, comprising:
      a handle base having an upper and a lower end and a base opening extending therethrough intersecting the upper and the lower ends thereof, a retaining ridge being connected to the handle base and disposed generally within the base opening and extending a distance generally into the base opening, and a snap knob connected to the handle base and disposed in the base opening and extending a distance generally into the base opening; and
   wherein the housing further comprises a slit formed through the upper end thereof and extending a distance generally toward the lower end thereof, the slit being sized to slidingly receive the retaining ridge on the handle base when the upper end of the housing is inserted into the base opening, each retaining ridge cooperating to substantially prevent rotational movement of the handle base relative to the housing, and wherein the housing further comprises a snap hole extending a distance through the housing and being disposed generally near the upper end of the housing, the snap hole being sized to snappingly receive the snap knob formed on the handle base when the handle base is disposed on the upper end of the housing for snappingly connecting the handle base to the housing; and
   means for snappingly connecting the handle assembly to the upper end of the housing.

14. The garden tool of claim 13 wherein the handle assembly further comprises:
   a pair of handle rods, one end of each handle rod being connected to the handle base and each handle rod extending a distance from the handle base in opposite directions.

15. The garden tool of claim 13 further comprising:
   means for removing the plug from the prong assembly.

16. The garden tool of claim 15 wherein the housing includes a housing opening extending therethrough intersecting the upper and lower ends thereof and wherein the means for removing the plug further comprises:
   a removal shaft slidingly disposed in the housing opening having a first end and a second end, the first end extending a distance generally above the upper end of the housing and the second end extending a distance generally below the lower end of the housing;
   a removal plate connected to the second end of the removal shaft and
   means for moving the removal shaft from a storage position to an eject position whereby the removal plate is movable from the storage position disposed generally adjacent the prong assembly to the eject position for ejectingly removing the plug from the prong assembly.

17. The garden tool of claim 16 wherein the means for removing the plug from the prong assembly further comprises:
   a cap connected to the upper end of the removal shaft; and
   a spring disposed generally between the upper end of the housing and the cap, the spring being adapted to springingly move the removal shaft and the removal plate connected thereto from the eject position to the storage position, the cap being movable in one direction against the spring for moving the removal shaft and the removal plate connected thereto from the storage position to the eject position.

18. A garden tool for extracting a plant having roots in the earth comprising:
   a housing having an upper end and a lower end, the housing having a housing opening extending therethrough and intersecting the upper and the lower ends thereof;
   a prong assembly connected to the lower end of the housing and being adapted for insertion in the earth generally about the plant to be extracted, the housing and the prong assembly being rotatable after insertion in the earth for compacting the earth about the plant to be extracted and forming a plug comprising the plant, a substantial portion of the plant root and a portion of the earth disposed generally within the prong assembly and surrounding the plant to be extracted, the housing and the prong assembly being removed from the earth along with the plug, comprising:

means for snappingly connecting the prong assembly to the lower end of the housing;

a handle assembly; and means for snappingly connecting the handle assembly to the upper end of the housing; and means for removing the plug from the prong assembly, comprising:

a removal shaft slidingly disposed in the housing opening having a first end and a second end, the first end extending a distance generally above the upper end of the housing and the second end extending a distance generally below the lower end of the housing;

a removal plate connected to the second end of the removal shaft;

means for moving the removal shaft from a storage position to an eject position whereby the removal plate is movable from the storage position disposed generally adjacent the prong assembly to the eject position for ejectingly removing the plug from the prong assembly;

a cap connected to the upper end of the removal shaft; and a spring disposed generally between the upper end of the housing and the cap, the spring being adapted to springingly move the removal shaft and the removal plate connected thereto from the eject position to the storage position, the cap being movable in one direction against the spring for moving the removal shaft and the removal plate connected thereto from the storage position to the eject position; and wherein the removal shaft includes a removal shaft opening extending therethrough and intersecting the upper and the lower ends thereof and wherein the cap is further defined as being connected to the first end of the removal shaft via a screw extending through the cap and being threadedly extended through a portion of the removal shaft opening generally near the first end of the removal shaft whereby the removal shaft opening provides means for initiating the threaded connection of the screw to the removal shaft.

19. The garden tool of claim 18 wherein the removal plate is further defined as being connected to the second end of the housing via a screw extending through the removal plate and being threadedly extended through a portion of the removal plate opening generally near the second end of the removal shaft whereby the removal shaft opening provides means for initiating the threaded connection of the screw to the removal shaft.

* * * * *